(12) United States Patent
Gasch et al.

(10) Patent No.: US 6,657,441 B2
(45) Date of Patent: Dec. 2, 2003

(54) METHOD AND APPARATUS FOR DETERMINING FLOW VELOCITIES

(75) Inventors: Armin Gasch, Heidelberg (DE); Peter Riegler, Griesheim (DE)

(73) Assignee: ABB Research Ltd., Zurich (CH)

( * ) Notice: Subject to any disclaimer, the term of this patent is extended or adjusted under 35 U.S.C. 154(b) by 22 days.

(21) Appl. No.: 09/996,259

(22) Filed: Nov. 28, 2001

(65) Prior Publication Data

US 2002/0060574 A1 May 23, 2002

Related U.S. Application Data

(63) Continuation of application No. PCT/EP00/04490, filed on May 18, 2000.

(30) Foreign Application Priority Data

May 28, 1999 (DE) .......................................... 199 24 592

(51) Int. Cl.[7] ........................ G01R 27/32; G01N 33/00; G01F 1/74
(52) U.S. Cl. .................... 324/639; 73/61.44; 73/861.04
(58) Field of Search ................................ 324/639, 633, 324/636, 642, 635, 643; 73/290 R, 61.44, 861.04

(56) References Cited

U.S. PATENT DOCUMENTS

| 4,905,203 A | 2/1990 | Sims et al. |
| 5,049,823 A | 9/1991 | Castel et al. |
| 5,389,883 A | 2/1995 | Harper |
| 5,747,749 A | 5/1998 | Bednarczyk et al. |
| 5,777,278 A | 7/1998 | Bednarczyk et al. |
| 5,792,962 A | 8/1998 | Constant et al. |
| 5,793,216 A | 8/1998 | Constant |
| 6,293,142 B1 * | 9/2001 | Pchelnikov et al. ...... 73/290 R |

FOREIGN PATENT DOCUMENTS

| DE | 44 26 280 A1 | 2/1996 |
| DE | 44 44 248 A1 | 6/1996 |
| GB | 2 271 637 A | 4/1994 |
| JP | 60263815 A | 12/1985 |
| WO | WO 91/05243 | 4/1991 |

OTHER PUBLICATIONS

International Search Report for PCT/EP00/04490, issued by the European Patent Office on Oct. 20, 2000.

* cited by examiner

Primary Examiner—John E. Chapman
Assistant Examiner—James Kerveros
(74) Attorney, Agent, or Firm—Laurence A. Greenberg; Werner H. Stemer; Gregory L. Mayback

(57) ABSTRACT

A method for determining flow velocities conducts an electromagnetic signal through a fluid flowing in a delivery line and additionally conducts the electromagnetic signal in a spatially delayed manner. A velocity, a velocity profile, and a volumetric fraction of each of the components of the fluid interacting with the electromagnetic wave is determined from a Doppler shift between the original electromagnetic signal and a resulting electromagnetic signal. An apparatus for determining flow velocities is also provided.

1 Claim, 2 Drawing Sheets

METHOD AND APPARATUS FOR DETERMINING FLOW VELOCITIES

CROSS-REFERENCE TO RELATED APPLICATION

This application is a continuation of copending International Application No. PCT/EP00/04490, filed May 18, 2000, which designated the United States.

BACKGROUND OF THE INVENTION

Field of the Invention

The invention relates to a method and an apparatus for measuring flow velocities of all components of a fluid flowing in a delivery line that interact with electromagnetic waves.

The measurements of the flow velocities and volumetric flows of fluids which have one or more components and/or phases, form the basis of every industrial process management. In the methods used to date for such measurements, the determination of the volumetric fractions and the determination of the flow velocities of the components of a fluid are performed separately from one another. The measuring apparatus is thus also split up into two or more devices. In this case, one device is used to determine the volumetric fractions, while a second device is used to determine the velocities. The determinations of the velocities and volumetric fractions are, moreover, not performed at the same point in the known methods. Due to this spatial separation, the measurements of the velocities and the volumetric fractions are effectively carried out at different times. Furthermore, it must be taken into account that the flow profile changes with time in many instances. If the velocities and volumetric fractions are determined from the correlation of such measurement signals of spatially separated measuring devices, the time dependence of the flow leads to a substantially reduced resolving power, with the result that measurement results that are more inaccurate are determined overall.

British Patent No. GB 2 271 637 B, corresponding to U.S. Pat. No. 5,389,883, describes a method with the aid of which it is possible to determine the volumetric fraction of gas and water in crude oil which is flowing through a delivery line. The respective volumetric fractions are determined with the aid of electromagnetic signals of high frequency, and the resonance signals thereof.

U.S. Pat. No. 5,792,962 discloses a method in which in order to measure the velocities of components of a fluid, use is made of the influence of the latter on the propagation characteristic of electric or acoustic signals which are led through the fluid.

U.S. Pat. No. 5,793,216 discloses a device for determining flow rates by conducting electromagnetic waves through a fluid. The fluid interacts with the electromagnetic waves and thus with the signal conducted through the fluid. The Doppler shift between the original electromagnetic signal and the resulting electromagnetic signal determines the velocity of the fluid.

Also known are measuring apparatuses in which high energy radiation in the form of X-rays or y-rays is used to determine the velocities and volumetric fractions of the components of a fluid. Because of this radiation, these devices are in part structurally very complex. Moreover, they must be provided with additional safety precautions.

The resolving power is mostly unsatisfactory in the known methods, in which the velocities and volumetric fractions of the components of a fluid are determined with the aid of the Doppler effect and electromagnetic radiation which has a low frequency of between 0 GHz and 1000 GHz. Because of the exceptionally low ratio of the average flow velocity of 5 m/s or less of a fluid to the speed of light in vacuum, frequency shifts which often cannot be resolved result for radiations in the GHz region specified above. Thus, the Doppler frequency shift resulting from the equation df=2(v/c)f is at only approximately 30 Hz for f=1 GHz and v=5 m/s.

SUMMARY OF THE INVENTION

It is accordingly an object of the invention to provide a method and an apparatus for measuring flow velocities which overcome the above-mentioned disadvantages of the heretofore-known methods and devices of this general type and with the aid of which the flow velocities and the volumetric fractions of all components of a flowing fluid which interact with electromagnetic waves can be determined in a simple way.

With the foregoing and other objects in view there is provided, in accordance with the invention, a method for determining flow velocities, the method includes the steps of:

conducting at least one electromagnetic signal having a frequency of between 0 GHz and 1000 GHz through a fluid flowing in a delivery line, the fluid having components interacting with electromagnetic waves, and additionally conducting the at least one electromagnetic signal in a spatially delayed manner; and determining a velocity, a velocity profile and a volumetric fraction of each of the components of the fluid from a Doppler shift between an original electromagnetic signal and a resulting electromagnetic signal.

In other words, a method for determining the flow velocities of all the components of a fluid flowing in a delivery line which interact with the electromagnetic waves is provided, wherein at least one electromagnetic signal with a frequency of between 0 GHz and 1000 GHz is conducted through the fluid and, additionally, spatially delayed, and in that the velocity, the velocity profile and the volumetric fraction of each component is determined from the Doppler shift between the original and the resulting signal.

The method according to the invention is used to determine the flow velocities and the volumetric fractions of the individual components of a fluid from the interaction of low-frequency electromagnetic radiation with the fluid. Use is made in this case of the cost-effective availability of electronics which are capable of utilizing the low-frequency electromagnetic measuring signals. An electromagnetic signal with a frequency of between 0 GHz and 1000 GHz is firstly generated with the aid of a signal generator. This signal is led through a delay line and through the fluid to be investigated. The delay line is arranged inside a metallic screen. The latter also surrounds the delivery line through which the fluid is transported. The velocity, the velocity profile and the volumetric fraction of the components of the fluid can be determined from the Doppler shift between the original and the resulting signal. Provided for this purpose is an evaluation unit which is fed two signals.

With the objects of the invention in view there is also provided, in combination with a delivery line having a fluid flowing therethrough, the fluid having components interacting with electromagnetic waves, an apparatus for determining flow velocities of the components of the fluid, including:

a screen partially surrounding the delivery line;

a delay line disposed within the screen;

a signal generator providing a low-frequency output signal to be coupled into the delay line;

a connecting element; and at least one coupling element projecting, via the connecting element, into the screen.

In accordance with another feature of the invention, the at least one coupling element is connected to the signal generator.

In accordance with another feature of the invention, an evaluation unit is connected to the at least one coupling element.

In accordance with yet another feature of the invention, the screen is a metal screen having a given length and completely surrounds the delay line; and the signal generator is configured to generate electromagnetic signals with frequencies of between 0 GHz and 1000 GHz.

In accordance with a further feature of the invention, the delay line is a helical line wound around the delivery line.

In accordance with another feature of the invention, the at least one coupling element is an antenna.

With the objects of the invention in view there is also provided, an apparatus for determining flow velocities, including:

a delivery line configured to transport a fluid having components interacting with electromagnetic waves;

a screen partially surrounding the delivery line;

a delay line disposed within the screen;

a connecting element;

at least one coupling element projecting, via the connecting element, into the screen;

a signal generator providing a low-frequency output signal to be coupled into the delay line; and an evaluation unit operatively connected to the at least one coupling element and determining flow velocities of the components of the fluid.

Other features which are considered as characteristic for the invention are set forth in the appended claims.

Although the invention is illustrated and described herein as embodied in a measurement method and an apparatus for carrying it out, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
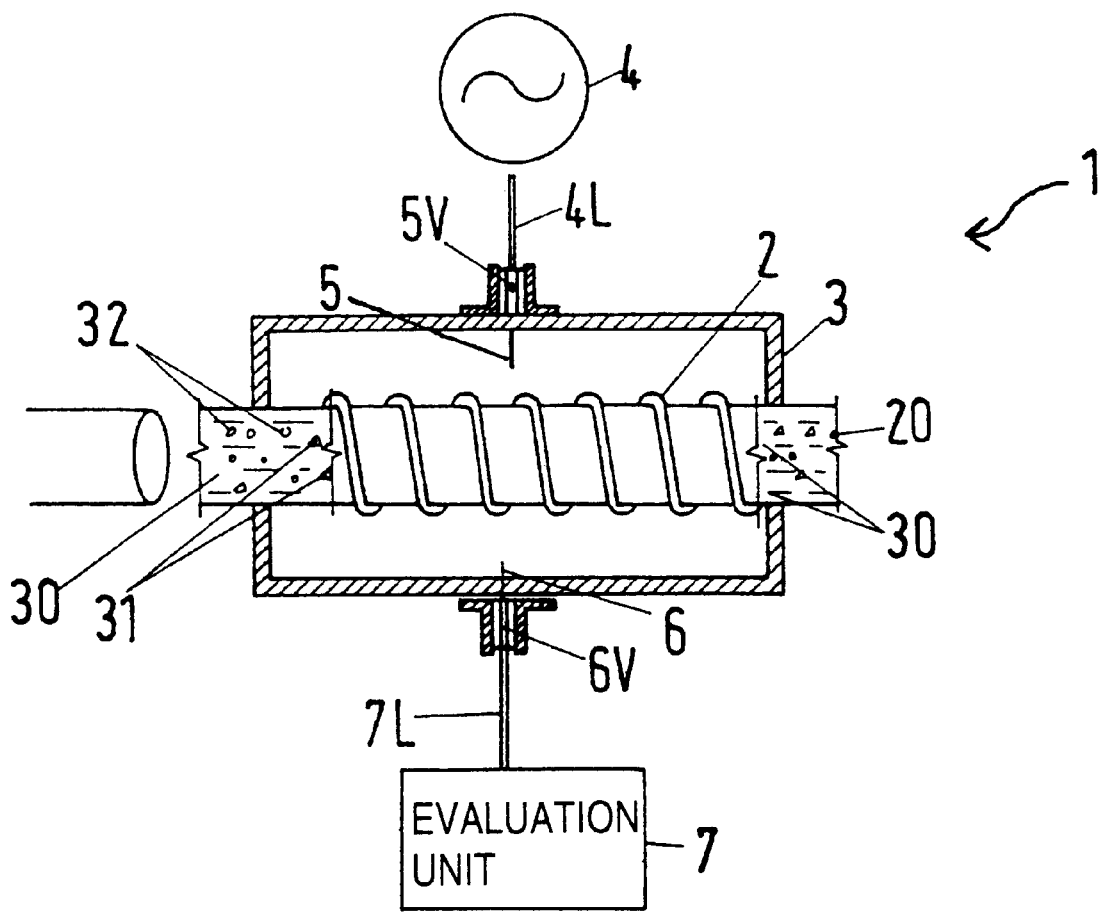
FIG. 1 is a schematic, partial sectional view of an apparatus for carrying out the method according to the invention.

Referring now to the figures of the drawings in detail and first, particularly, to FIG. 1 thereof, there is shown an apparatus 1 with a delay line 2, a screen 3, a signal generator 4, two antennas 5 and 6, and an evaluation unit 7. The screen 3 is configured as a closed housing which is made from metal. It is penetrated by a tubular delivery line 20 through which a fluid 30 flows. The fluid 30 has two components 31 and 32 in the exemplary embodiment illustrated here. These components have the property that an interaction takes place between them and the electromagnetic waves and can be used to determine the flow velocity of the individual components. The signal generator 4 generates low-frequency electromagnetic signals with a frequency of between 0 GHz and 1000 GHz for the measurements. The choice of the frequency profiles of the signals is determined in essence by the dielectric properties of the components of the fluid. It is therefore possible in the case of the method according to the invention for the flow velocity to be determined with the aid of these low-frequency electromagnetic signals, because their propagation rate is reduced with the aid of the delay line 2, and thus the relative frequency shift is increased on the basis of the Doppler effect. The delay line 2 is produced from a material and in a form which are suitable to conduct such low-frequency signals. What is decisive for the geometry of the delay line 2 is just that it permits a sufficiently long delay of the signals such that the desired resolving power or resolution is achieved. In the exemplary embodiment illustrated here, the delay line 2 is wound in the form of a helix around the delivery line 20. However, it is also possible for the delay line 2 to be guided in other ways but still with the same function. The signal generated by the signal generator 4 is fed to the antenna 5 via the signal line 4L. The connection between the antenna 5, which is located inside the screen 3, and the signal line 4L takes place via a suitable connecting element 5V which projects outwards and is guided inwards through the screen 3. The signal is coupled into the delay line 2 via the antenna 5. It is guided spatially through the delay line 2 and propagates simultaneously in the flowing fluid. If the delay line 2 is not operated in resonant mode, the coupling can also be performed directly from the signal line 4L into the delay line 2, and in this case the antenna 5 is connected in an electrically conducting fashion to the delay line 2. It is possible to carry out the method according to the invention no matter whether the delay line 2 is operated in a resonant mode or a pass-through mode.

The signal generator 4 and the evaluation unit 7 are not disposed inside the screen 3 in the exemplary embodiment illustrated here. The signal generator and the evaluation unit 7 are preferably installed on land when the method according to the invention is used, for example, to monitor the quantity of crude oil delivered from an undersea production facility. They are then connected to the apparatus 1 only via the signal lines 4L and 7L. The signal generator 4 and the evaluation unit 7 can, however, also be mounted jointly or separately from one another in a watertight housing (not illustrated) next to the screen 3. However, this is possible only when an electric power supply is present at this point. The evaluation unit is then preferably connected to a display device (not illustrated) installed on land via a further signal line (not illustrated).

The antenna 6 is installed the same way as the antenna 5. It is connected via a connecting element 6V, which is guided through the screen, to a signal line 7L which is connected to the evaluation unit 7. The geometrical shape of the antennas 5 and 6 is not essential for carrying out the method according to the invention. The same also holds for the geometrical configuration of the two antennas 5 and 6 relative to one another. It is also possible to replace the two antennas 5 and 6 by a single antenna which takes over the functions of the two antennas 5 and 6. Each of the two antennas 5 and 6 can also be replaced per se by a suitable array of antennas (not illustrated). Alternatively, the antennas can be implemented by direct electric contact via suitably selected impedance components, for example capacitors (not illustrated). The antenna 6 is used to couple out an electromagnetic signal from the inner region of the screen 3, specifically at the same time as coupling in the coupled-in signal. The signals coupled out contain the desired information on the velocity profile of the components 31 and 32 of the fluid 30. An example of the characteristic of a signal 40 generated by the signal generator 4, and the characteristics of the signals 41 and 42, which are coupled out of the screen 3 for the fluid 30 with the two components 31 and 32 are illustrated diagrammatically in FIG. 2.

The physical measurement process is followed by a data analysis in the evaluation unit 7, in order to determine the velocity profile from the electromagnetic signals radiated in and coupled out. The signal coupled out is fed to the evaluation unit 7 from the antenna 6 via the signal line 7L. The evaluation unit 7 is configured as a spectrum analyser, as a microprocessor or as a suitable combination thereof. There are several options for carrying out the analysis of the signals fed in. For example, processing in the time domain, frequency analysis or Fourier analysis, or any other orthogonal or nonorthogonal decomposition of the signals is possible. Furthermore, methods of information theory such as maximum likelihood or maximum entropy methods can be applied. In addition, the measurement signals are conditioned in the evaluation unit 7 such that measurement results are available which are independent of the temperature.

Figure 2:
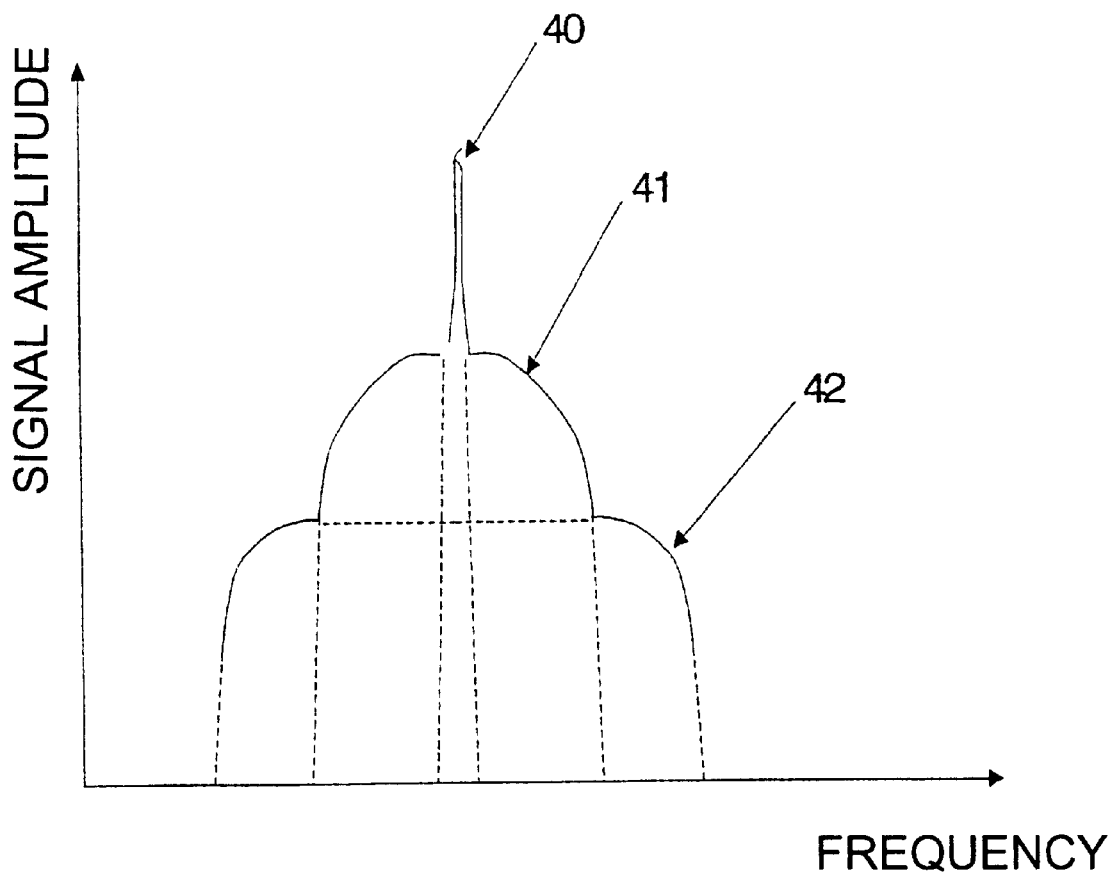
FIG. 2 is a graph for illustrating the Doppler spectrum of a fluid determined in the case of a velocity measurement.

The velocity profiles of the components 31 and 32 are calculated in the evaluation unit 7 from the signal 40 coupled in and the signals 41 and 42 coupled out, in accordance with FIG. 2. The signal generated by the signal generator 4 is also fed for this purpose to the evaluation unit 7 via a branching in the signal line 4L. The information contained in the signals coupled out permits various physical properties of the flowing fluid to be determined. This can be seen in FIG. 2 from the frequency spectrum of the signals 41 and 42 coupled out. The frequency spectrum contains structures which can be assigned to the velocity profiles of the individual components 31 and 32 as a function of the dielectric properties of the components. The width of the respective curve is a measure of the maximum velocity of a component in accordance with the Doppler effect. Furthermore, the area under each curve is a measure for the volumetric fraction of the corresponding component of the flowing fluid. The height of the structure also depends, in addition to the volumetric fraction, on the dielectric properties of the associated component. It therefore permits identification of the material. However, an assignment between the characteristic shapes of the spectral structures and the volumetric fractions of the respective components can be carried out through the use of an independent measurement of the fractions with the aid of the method which is described in British Patent No. GB 2 271 637 B, corresponding to U.S. Pat. No. 5,389,883.

A possible application of the method according to the invention is, as already mentioned above, given in the field of undersea crude oil production. In order to be able to measure the quantity of crude oil produced over a specific interval of time, it is important to know how large the volumetric fraction of the crude oil is which is transported away per unit of time from a drilling site via a delivery line. Not only oil, but also water and gas enter the delivery line, and so the overall quantity delivered per unit of time does not correspond exactly to the quantity of crude oil delivered. The method according to the invention can be used in this case to determine the velocities and the volumetric fractions of oil 31 and water 32. The volumetric fraction of the gas can be determined from the total volume of the fluid 30 and the volumetric fractions of the components 31 and 32, and so the quantity of oil 31 delivered per unit of time can be determined if the flow velocities of oil 31 and water 32 are known.

We claim:

1. A method for determining flow velocities, the method which comprises:
    generating at least one electromagnetic signal having a frequency of between 0 GHz and 1000 GHz;
    passing the generated signal through a fluid flowing in a delivery line, the fluid having components interacting with electromagnetic waves;
    additionally spatially delaying the at least one electromagnetic signal; and
    determining a velocity, a velocity profile and a volumetric fraction of each of the components of the fluid from a Doppler shift between an original electromagnetic signal and a resulting electromagnetic signal.

* * * * *